(12) United States Patent
Singer et al.

(10) Patent No.: US 9,092,020 B2
(45) Date of Patent: Jul. 28, 2015

(54) CALIBRATION DATA SELECTION

(71) Applicant: GM Global Technology Operations LLC, Detroit, MI (US)

(72) Inventors: Ian R. Singer, Macomb, MI (US); Frank C. Valeri, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/048,402

(22) Filed: Oct. 8, 2013

(65) Prior Publication Data

US 2015/0100200 A1    Apr. 9, 2015

(51) Int. Cl.
  *G01M 17/00*   (2006.01)
  *G05D 1/00*   (2006.01)
  *G05B 13/02*   (2006.01)

(52) U.S. Cl.
  CPC .................................. *G05B 13/021* (2013.01)

(58) Field of Classification Search
  USPC .................................................. 701/33.1, 42
  See application file for complete search history.

(56) References Cited

U.S. PATENT DOCUMENTS

| | | | |
|---|---|---|---|
| 8,713,404 B2* | 4/2014 | Fai et al. | 714/763 |
| 2007/0025559 A1* | 2/2007 | Mihelich et al. | 381/59 |
| 2008/0020807 A1* | 1/2008 | Kolano et al. | 455/569.1 |
| 2008/0226101 A1* | 9/2008 | Silber et al. | 381/123 |
| 2009/0134890 A1* | 5/2009 | Johnson | 324/713 |
| 2009/0164060 A1* | 6/2009 | Fortson et al. | 701/35 |
| 2010/0290643 A1* | 11/2010 | Mihelich et al. | 381/99 |
| 2011/0064232 A1* | 3/2011 | Ruwisch | 381/59 |
| 2011/0116642 A1* | 5/2011 | Hall et al. | 381/58 |
| 2011/0133953 A1* | 6/2011 | Nagatomo | 340/905 |
| 2012/0041638 A1* | 2/2012 | Johnson et al. | 701/33.1 |
| 2012/0174111 A1* | 7/2012 | Pala et al. | 718/102 |
| 2012/0215754 A1* | 8/2012 | Marzani et al. | 707/705 |
| 2013/0076506 A1* | 3/2013 | Smith et al. | 340/514 |

\* cited by examiner

*Primary Examiner* — Thomas G Black
*Assistant Examiner* — Tyler Paige
(74) *Attorney, Agent, or Firm* — Cantor Colburn LLP

(57) ABSTRACT

A system is provided that includes an audio source configured to drive at least one audio output and a module under calibration integrated in a vehicle. The module under calibration is configured to receive a calibration command sequence from the audio source and decode the calibration command sequence into a digitally-encoded calibration command. The module under calibration is further configured to select a set of calibration data from a plurality of sets of calibration data to configure the module under calibration based on the digitally-encoded calibration command.

18 Claims, 4 Drawing Sheets

CALIBRATION DATA SELECTION

FIELD OF THE INVENTION

Exemplary embodiments of the invention are related to systems and methods for calibration data selection for a non-bussed module.

BACKGROUND

Vehicles typically include one or more vehicle information busses for inter-module communication. However, not all vehicle modules are connected to the vehicle information busses. For example, an active noise cancellation module can be connected to a microphone and to vehicle speakers through an amplifier, but the active noise cancellation module may not be connected to vehicle information busses where inter-module communication is unnecessary. Vehicle information busses can also be used to remotely program or reconfigure vehicle modules that are connected thereto. In the absence of a connection to a vehicle information bus, programming of a vehicle module while integrated in a vehicle is not typically possible.

Some vehicle modules share a common design such that they are substantially similar except for constant values that are customized for particular vehicle configurations. For example, a given automobile model may have multiple engine options, upholstery options, sun/moon roof options, and the like. Numerous possible combinations of options may result in different configuration data. When in-vehicle module programming is not possible, each unique configuration results in a different vehicle module part number, which must be correctly installed in the corresponding vehicle. As the number of possible configurations increases, the chances of incorrectly installing a mismatched configuration can also increase. A greater variety of part numbers for similar parts can also lead to inventory control issues.

Accordingly, it is desirable to provide systems and methods for calibration data selection for vehicle modules without a vehicle information bus interface.

SUMMARY OF THE INVENTION

In one exemplary embodiment, a system is provided that includes an audio source configured to drive at least one audio output and a module under calibration integrated in a vehicle. The module under calibration is configured to receive a calibration command sequence from the audio source and decode the calibration command sequence into a digitally-encoded calibration command. The module under calibration is further configured to select a set of calibration data from a plurality of sets of calibration data to configure the module under calibration based on the digitally-encoded calibration command.

In another exemplary embodiment, a method of calibration data selection in a vehicle system is provided. A channel is established between an audio source and a module under calibration that is integrated in the vehicle system. A calibration command sequence is output from the audio source on the channel for the module under calibration. The calibration command sequence is received by the module under calibration on the channel. The calibration command sequence is decoded into a digitally-encoded calibration command. A set of calibration data is selected from a plurality of sets of calibration data to configure the module under calibration based on the digitally-encoded calibration command.

In a further exemplary embodiment, a vehicle is provided that includes at least one audio output, an audio source configured to drive the at least one audio output, and a module under calibration. The module under calibration is configured to receive a calibration command sequence from the audio source, decode the calibration command sequence into a digitally-encoded calibration command, and select a set of predetermined calibration data for the vehicle from a plurality of sets of calibration data to configure the module under calibration based on the digitally-encoded calibration command.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
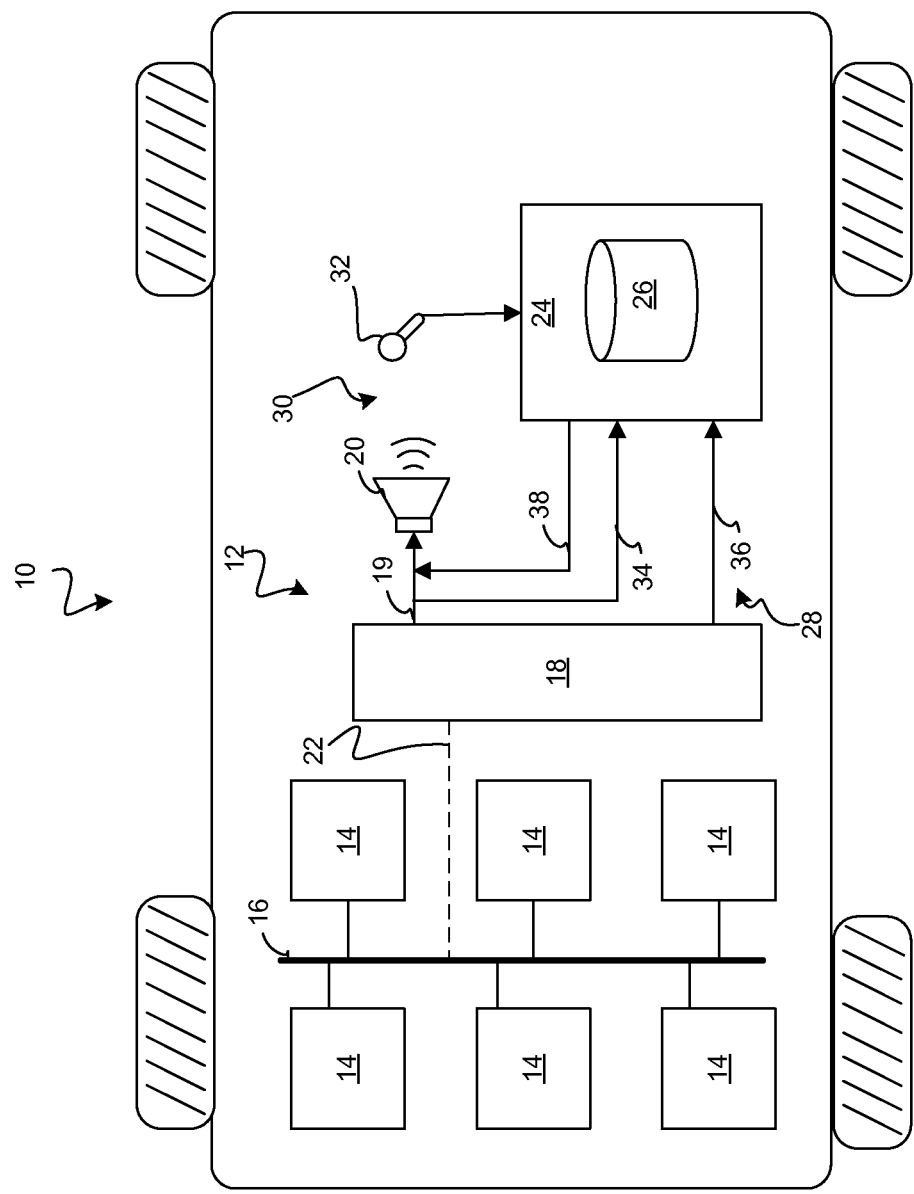
FIG. 1 is a schematic illustration of a vehicle including an audio source and a module under calibration in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention a vehicle is shown generally at 10 in FIG. 1. The vehicle 10 includes a vehicle system 12, which is also referred to as system 12. The vehicle system 12 includes a plurality of bussed modules 14 coupled to a vehicle information bus 16. The bussed modules 14 may support a number of specific functions for the vehicle 10, such as an engine control module, a transmission control unit, an anti-lock braking system, and body control modules. In the example of FIG. 1, the vehicle system 12 also includes an audio source 18 configured to drive at least one audio output 19. The at least one audio output 19 can include one or more speakers 20 and/or a physical audio link 34. The audio source 18 may have a connection 22 to the vehicle information bus 16, but the connection 22 need not be included in embodiments. The vehicle system 12 further includes a module under calibration 24 which is not coupled to the vehicle information bus 16. Accordingly, the module under calibration 24 cannot be directly programmed over the vehicle information bus 16.

The module under calibration 24 includes a plurality of sets of calibration data 26 associated with numerous possible vehicle configurations. In order to select a set of calibration data that aligns with the vehicle 10, a channel 28 is established between the audio source 18 and the module under calibration 24. The channel 28 can be an audio channel 30 established between at least one speaker 20 driven in response to the audio source 18 and a microphone 32 configured to provide input to the module under calibration 24. In one embodiment, the channel 28 can be established on a physical audio link 34 between a line out of the audio source 18 and the module under calibration 24. In another embodiment, the channel 28 can be established on a remote enable line 36, which is otherwise typically used to provide a remote enable command to the module under calibration 24. Where the module under calibration 24 is an active noise cancellation module, the module under calibration 24 can also include a speaker output 38 configured to add sound on at least one speaker 20 during a normal mode of operation. In an embodiment, the audio source 18 is a module that plays tones on the at least one audio output 19 in the vehicle 10 to calibrate the module under calibration 24, which listens for the tones via the microphone 32 and/or the physical audio link 34.

Although the audio source 18 is depicted within the vehicle 10, the scope of embodiments is not so limited. For example, the audio source 18 can be external to the vehicle 10 and need not be integrated within the vehicle 10, such as an external and/or portable sound generating device. In one embodiment, the audio source 18 may be integrated in the vehicle 10, such as a dashboard mounted radio/compact disc (CD) player. In an exemplary embodiment, the module under calibration 24 is integrated in the vehicle system 12 within the vehicle 10 while calibration data selection is performed. In other embodiments, one or more of: the audio channel 30, the physical audio link 34, the remote enable line 36, and the speaker output 38 may be omitted so long as at least one channel 28 is retained.

Figure 2:
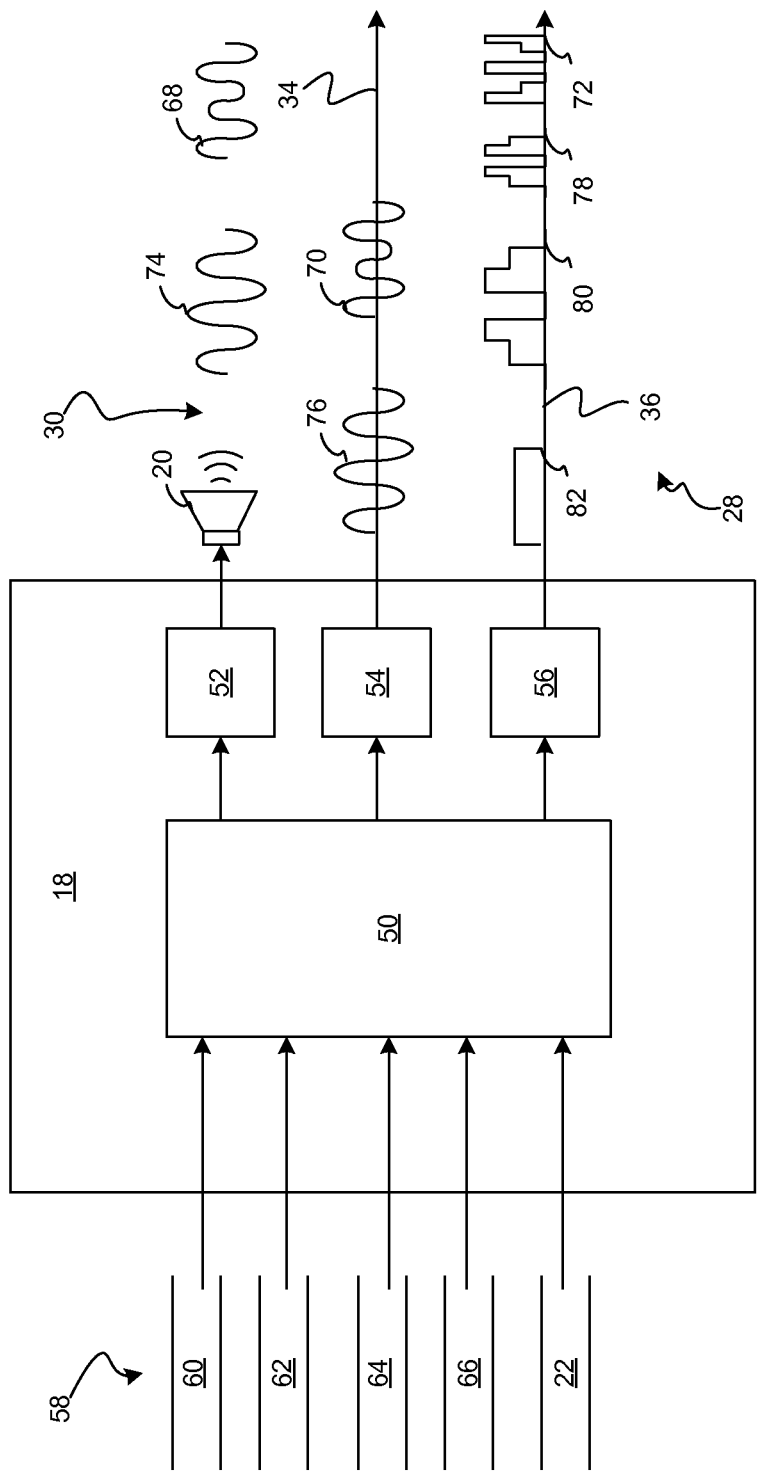
FIG. 2 is a dataflow diagram for the audio source of FIG. 1 in accordance with an exemplary embodiment.

FIG. 2 is a dataflow diagram for the audio source 18 of FIG. 1 in accordance with an exemplary embodiment. In the example of FIG. 2, the audio source 18 includes an input selection module 50 coupled to a speaker driver 52, an audio line driver 54, and a remote enable line driver 56. The speaker driver 52 is coupled to at least one speaker 20 to establish audio channel 30. The audio line driver 54 is coupled to the physical audio link 34, and the remote enable line driver 56 is coupled to the remote enable line 36. The speaker driver 52, audio line driver 54, and remote enable line driver 56 include elements known in the art to condition and drive signals responsive to input sources 58. Any of the speaker driver 52, audio line driver 54, or remote enable line driver 56 can be omitted so long as at least one channel 28 is retained.

The input selection module 50 can receive input from a number of input sources 58. Input may be in the form of audio files, messages, streaming data, or other formats known in the art. For example, the input sources 58 can include one or more of: a CD/digital versatile disc (DVD) disc 60, a universal serial bus (USB) interfaced device 62, an auxiliary input 64, or a wireless link 66, e.g., Bluetooth. In embodiments where the audio source 18 is coupled to the vehicle information bus 16 of FIG. 1, the connection 22 to the vehicle information bus 16 may also be an input source 58. The input selection module 50 can drive output on a channel 28 depending upon the configuration of the vehicle system 12 of FIG. 1. For example, the input selection module 50 may receive audio input from the CD/DVD 60 that includes an encoded calibration mode command sequence which can be output as a calibration mode command sequence 68 on the audio channel 30, a calibration mode command sequence 70 on the physical audio link 34, or a calibration mode command sequence 72 on the remote enable line 36. The calibration mode command sequences 68-72 may be used to provide a mode transition request to the module under calibration 24 of FIG. 1, such that the module under calibration 24 is ready to receive and decode a calibration command sequence. In another embodiment, the calibration mode command sequences 68-72 can be omitted where the module under calibration 24 of FIG. 1 is configured to monitor for a calibration command sequence by default or other action.

The input selection module 50 receives a calibration command sequence from the input source 58 and drives output on one channel 28 depending upon the configuration of the vehicle system 12 of FIG. 1. For example, the input selection module 50 may receive audio input from an audio file on the CD/DVD 60 that includes an encoded calibration command sequence which can be output as a calibration command sequence 74 on the audio channel 30, a calibration command sequence 76 on the physical audio link 34, or a calibration command sequence 78 on the remote enable line 36. The calibration command sequence 74 and the calibration command sequence 76 may be encoded as audio signals, where a sequence of tones is included that defines a specific configuration of the vehicle 10 of FIG. 1 to assist the module under calibration 24 of FIG. 1 in selecting a set of calibration data from a plurality of sets of calibration data 26 of FIG. 1. The calibration command sequence 78 on the remote enable line 36 may encode a specific configuration of the vehicle 10 of FIG. 1 across a range of voltages and at a switching frequency such that the calibration command sequence 78 is distinguishable from a remote enable command 82 on the remote enable line 36.

Other commands can also be supported by each channel 28. For example, a diagnostic command sequence 80 can be transmitted on the remote enable line 36 to trigger self-diagnostics in the module under calibration 24 of FIG. 1.

Figure 3:
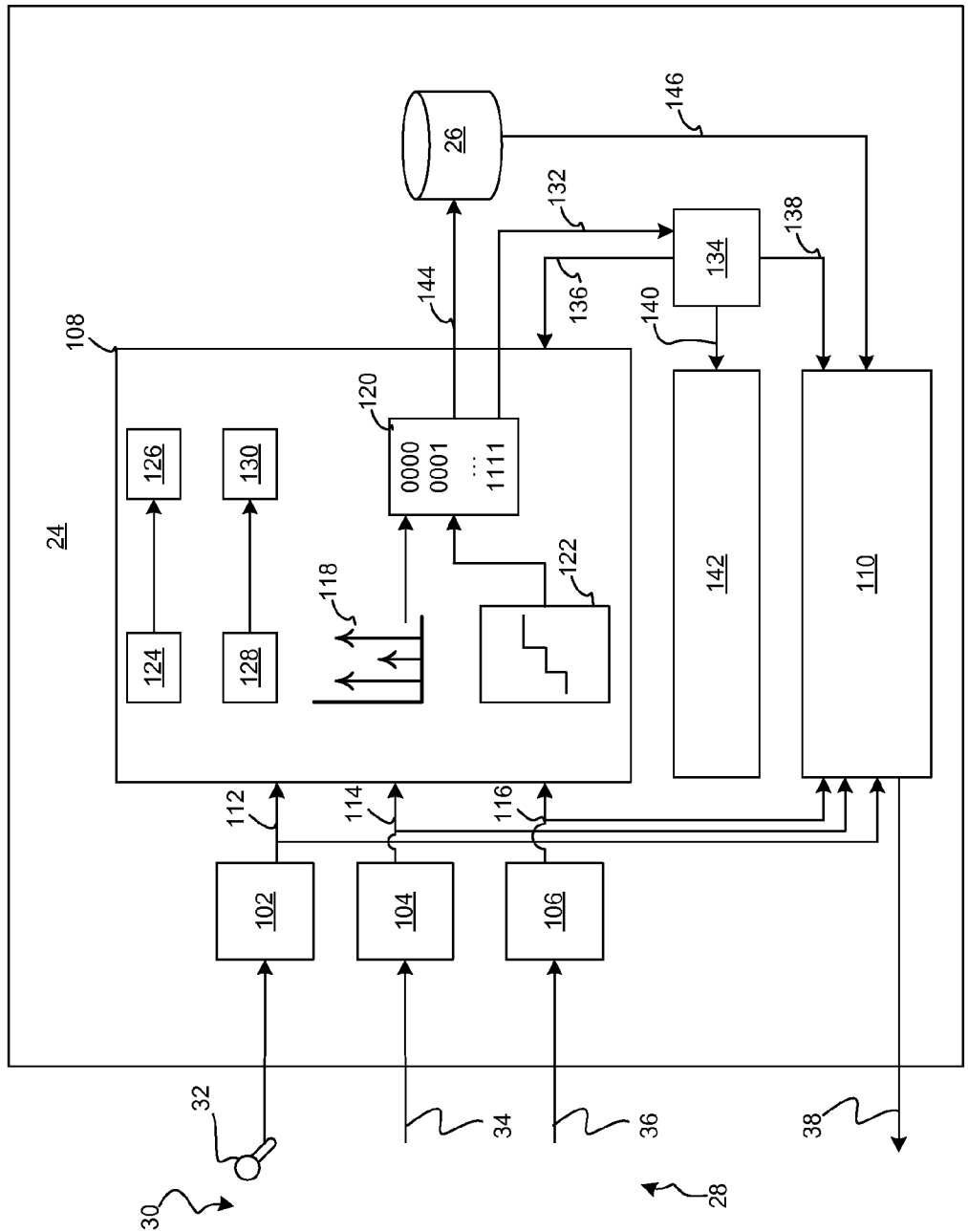
FIG. 3 is a dataflow diagram for the module under calibration of FIG. 1 in accordance with an exemplary embodiment.

FIG. 3 is a dataflow diagram for the module under calibration 24 of FIG. 1 in accordance with an exemplary embodiment. The module under calibration 24 includes a microphone receiver 102, an audio line receiver 104, and a remote enable line receiver 106. The microphone receiver 102 is coupled to the microphone 32 to establish audio channel 30 in conjunction with at least one speaker 20 of FIGS. 1 and 2. The audio line receiver 104 is coupled to the physical audio link 34, and the remote enable line receiver 106 is coupled to the remote enable line 36. The microphone receiver 102, audio line receiver 104, and remote enable line receiver 106 include elements known in the art to receive and condition signals on each channel 28. Any of the microphone receiver 102, audio line receiver 104, or remote enable line receiver 106 can be omitted so long as at least one channel 28 is retained.

In the example of FIG. 3, the microphone receiver 102, audio line receiver 104, and remote enable line receiver 106 provide inputs 112, 114, and 116 respectively to a decoder module 108 and a normal mode module 110. Inputs 112 and 114 may be audio formats that are decomposed into a sequence of tones 118. The sequence of tones 118 may be processed using tuning filters, fast Fourier transforms, targeted discrete Fourier transforms, or any other technique known in the art to extract tonal information. Information may be encoded in the sequence of tones 118 based on relative amplitudes, frequencies, time sequencing, and/or phase relationships. The decoder module 108 maps the sequence of tones 118 to a digital value 120. Similarly, the decoder module 108 can analyze voltage, frequency and/or timing information for input 116 at detector module 122 to map the input 116 to a digital value 120. The mapping performed by the decoder module 108 can be used to decode a calibration mode command sequence 124 into a digitally-encoded calibration mode command 126, decode a calibration command sequence 128 into a digitally-encoded calibration command 130, or perform other decoding. In this example, the calibration mode command sequence 124 is a received version of one of the calibration mode command sequences 68-72 of FIG. 2, and the calibration command sequence 128 is a received version of one of the calibration command sequences 74-78 of FIG. 2.

As previously described, the calibration mode command sequence 124 and the digitally-encoded calibration mode command 126 can be omitted where a separate mode transition step is not desired. Where mode transitions are desired, the digitally-encoded calibration mode command 126 can be output on line 132 to mode selection module 134. The mode selection module 134 can transition the module under calibration 24 into a calibration mode via line 136 based on the digitally-encoded calibration mode command 126, such that the module under calibration 24 is ready to receive and decode the calibration command sequence 128. The mode selection module 134 can transition the module under calibration 24 into a normal mode via line 138 based on, for instance, the remote enable command 82 of FIG. 2, to enable the normal mode module 110. In another embodiment, the mode selection module 134 can transition the module under calibration 24 into a diagnostic mode via line 140 based on, for instance, the diagnostic command sequence 80 of FIG. 2 to enable a diagnostic module 142. Although no connections are depicted between the diagnostic module 142 and the microphone 32, the physical audio link 34, the remote enable line 36, or the speaker output 38, it will be understood that the diagnostic module 142 may be configured to check interfaces associated with these as well as other portions of the module under calibration 24 that are not depicted. The mode selection module 134 can support additional modes and may include other connections beyond those depicted in FIG. 3 to support mode transitions.

In an embodiment, the digital value 120 for the digitally-encoded calibration command 130 may be used as an index 144 to select a set of calibration data 146 from the plurality of sets of calibration data 26 to configure the module under calibration 24 based on the digitally-encoded calibration command 130. The set of calibration data 146 can be passed to the normal mode module 110 to configure constants specific to the vehicle 10 of FIG. 1. For example, where the module under calibration 24 is an active noise cancellation module, calibration data used for sound conditioning on at least one speaker 20 of FIG. 1 can change based on an engine type/size, upholstery type, presence of a sun/moon roof, or other factors specific to the present configuration of the vehicle 10 of FIG. 1. The normal mode module 110 can apply audio conditioning algorithms known in the art and customized according to the set of calibration data 146 to provide audio enhancements on the speaker output 38 specific to the vehicle 10 of FIG. 1.

Figure 4:
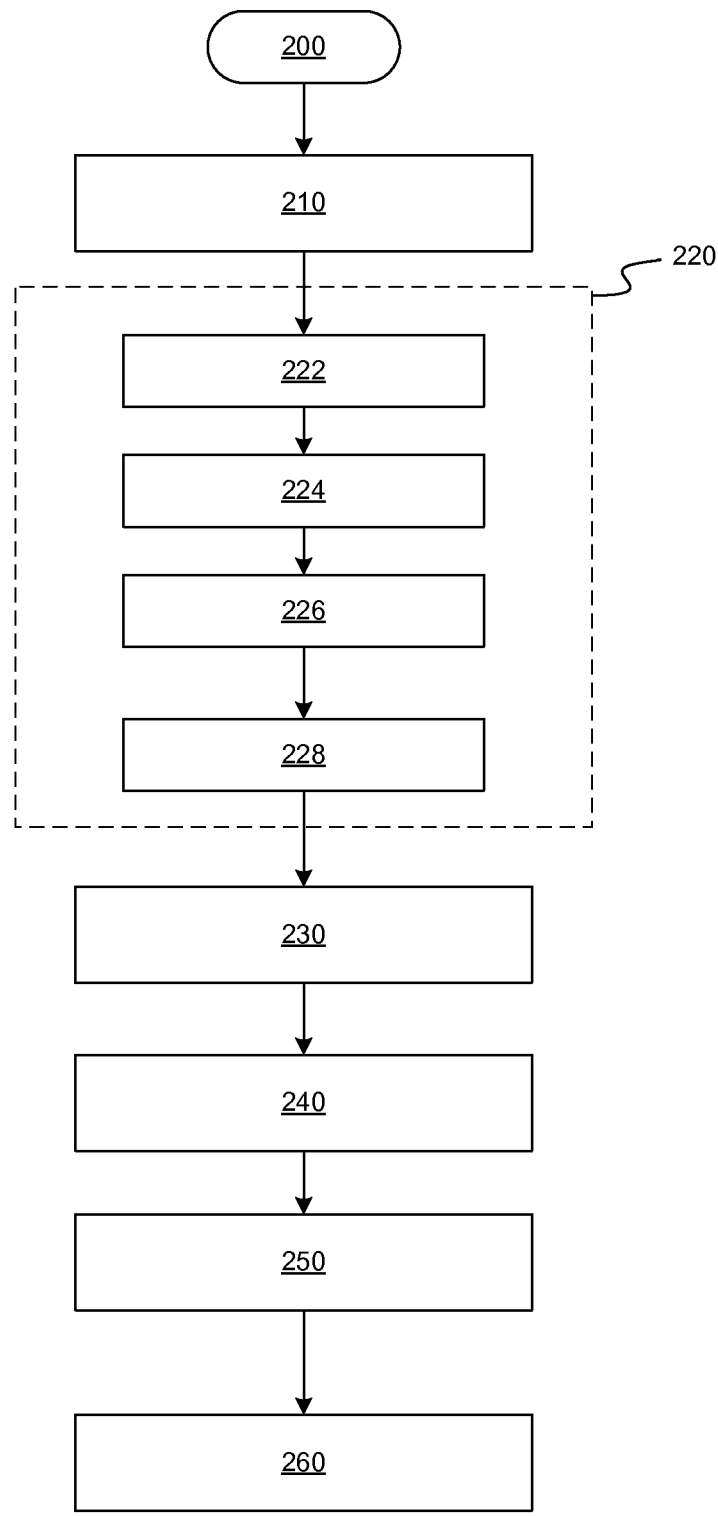
FIG. 4 is a flowchart illustrating a calibration data selection method in accordance with an exemplary embodiment.

Referring now to FIG. 4, and with continued reference to FIGS. 1-3, a flowchart illustrates calibration data selection methods that can be performed in the vehicle system 12 in accordance with the present disclosure. As can be appreciated in light of the disclosure, the order of operations within the method is not limited to the sequential execution as illustrated in FIG. 4, but may be performed in one or more varying orders as applicable and in accordance with the present disclosure. As can further be appreciated, one or more steps may be added or removed without altering the spirit of the method.

In one example, the method may begin at 200. At 210, a channel 28 is established between the audio source 18 and the module under calibration 24 that is integrated in the vehicle system 12. In embodiments where calibration is performed after a mode transition, 220 can be performed; otherwise, 220 can be omitted. Within 220 at 222, calibration mode command sequence 68, 70, or 72 is output from the audio source 18 on the channel 28 for the module under calibration 18. At 224, the calibration mode command sequence 68, 70, or 72 is received as calibration mode command sequence 124 by the module under calibration 24 on the channel 28. At 226, the calibration mode command sequence 124 is decoded into a digitally-encoded calibration mode command 126. At 228, the module under calibration 24 transitions into a calibration mode based on the digitally-encoded calibration mode command 126, such that the module under calibration 24 is ready to receive and decode the calibration command sequence 128.

At 230, the calibration command sequence 74, 76, or 78 is output from the audio source 18 on the channel 28 for the module under calibration 24. At 240, the calibration command sequence 74, 76, or 78 is received as calibration command sequence 128 by the module under calibration 24 on the channel 28. At 250, the calibration command sequence 128 is decoded into a digitally-encoded calibration command 130. At 260, a set of calibration data 146 is selected from a plurality of sets of calibration data 26 to configure the module under calibration 24 based on the digitally-encoded calibration command 130.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system, comprising:
   an audio source configured to drive at least one audio output; and
   a module under calibration integrated in a vehicle, the module under calibration configured to:
      receive a calibration command sequence from the audio source, wherein the calibration command sequence comprises a sequence of tones associated with a set of calibration data;
      decode the calibration command sequence into a digitally-encoded calibration command by identifying the sequence of tones and mapping the sequence of tones to a digital value; and
      select the set of calibration data from a plurality of sets of calibration data to configure the module under calibration based on the digitally-encoded calibration command.

2. The system of claim 1, wherein the at least one audio output comprises at least one speaker, the audio source is further configured to drive the calibration command sequence on the at least one speaker, and the system further comprises a microphone configured to provide input to the module under calibration.

3. The system of claim 1, wherein the at least one audio output comprises a physical audio link between the audio source and the module under calibration, and the audio source is configured to provide the calibration command sequence on the physical audio link to the module under calibration.

4. The system of claim 1, further comprising a remote enable line between the audio source and the module under calibration, wherein the audio source is configured to provide the calibration command sequence on the remote enable line to the module under calibration across a range of voltages and at a switching frequency that is distinguishable from a remote enable command on the remote enable line.

5. The system of claim 4, wherein the module under calibration is further configured to trigger self-diagnostics responsive to receiving a diagnostic command sequence on the remote enable line.

6. The system of claim 1, wherein the audio source is further configured to output a calibration mode command sequence, and the module under calibration is further configured to:
   receive the calibration mode command sequence;
   decode the calibration mode command sequence into a digitally-encoded calibration mode command; and
   transition into a calibration mode based on the digitally-encoded calibration mode command, such that the module under calibration is ready to receive and decode the calibration command sequence.

7. The system of claim 1, wherein the audio source is integrated in the vehicle, and the system further comprises a plurality of bussed modules coupled to a vehicle information bus, and the module under calibration is not coupled to the vehicle information bus.

8. A method of calibration data selection in a vehicle system, the method comprising:
   establishing a channel between an audio source and a module under calibration that is integrated in the vehicle system;
   outputting a calibration command sequence from the audio source on the channel for the module under calibration, wherein the calibration command sequence comprises a sequence of tones associated with a set of calibration data;
   receiving the calibration command sequence by the module under calibration on the channel;
   decoding the calibration command sequence into a digitally-encoded calibration command by identifying the sequence of tones and mapping the sequence of tones to a digital value; and
   selecting the set of calibration data from a plurality of sets of calibration data to configure the module under calibration based on the digitally-encoded calibration command.

9. The method of claim 8, wherein the channel is an audio channel established between at least one speaker driven in response to the audio source and a microphone configured to provide input to the module under calibration.

10. The method of claim 8, wherein the channel is established on a physical audio link between the audio source and the module under calibration.

11. The method of claim 8, wherein the channel is established on a remote enable line, and the calibration command sequence is provided across a range of voltages and at a switching frequency that is distinguishable from a remote enable command on the remote enable line.

12. The method of claim 11, wherein the module under calibration is further configured to trigger self-diagnostics responsive to receiving a diagnostic command sequence on the remote enable line.

13. The method of claim 8, further comprising:
   outputting a calibration mode command sequence from the audio source on the channel for the module under calibration;
   receiving the calibration mode command sequence by the module under calibration on the channel;
   decoding the calibration mode command sequence into a digitally-encoded calibration mode command; and
   transitioning the module under calibration into a calibration mode based on the digitally-encoded calibration mode command, such that the module under calibration is ready to receive and decode the calibration command sequence.

14. The method of claim 8, wherein the audio source is integrated in the vehicle system, and the vehicle system further comprises a plurality of bussed modules coupled to a vehicle information bus, and the module under calibration is not coupled to the vehicle information bus.

15. A vehicle, comprising:
   at least one audio output;
   an audio source configured to drive the at least one audio output; and
   a module under calibration, the module under calibration configured to receive a calibration command sequence from the audio source, the calibration command sequence comprising a sequence of tones associated with a set of calibration data, decode the calibration command sequence into a digitally-encoded calibration command by identifying the sequence of tones and mapping the sequence of tones to a digital value, and select the set of calibration data for the vehicle from a plurality of sets of calibration data to configure the module under calibration based on the digitally-encoded calibration command.

16. The vehicle of claim 15, wherein the at least one audio output comprises at least one speaker, the audio source is further configured to drive the calibration command sequence on the at least one speaker, and the vehicle further comprises a microphone configured to provide input to the module under calibration.

17. The vehicle of claim 15, wherein the at least one audio output comprises a physical audio link between the audio source and the module under calibration, and the audio source is configured to provide the calibration command sequence on the physical audio link to the module under calibration.

18. The vehicle of claim 15, further comprising a remote enable line between the audio source and the module under calibration, wherein the audio source is configured to provide the calibration command sequence on the remote enable line to the module under calibration across a range of voltages and at a switching frequency that is distinguishable from a remote enable command on the remote enable line.

* * * * *